Jan. 6, 1942.   J. A. C. YULE   2,268,791
COLOR CORRECTION
Filed April 30, 1940   2 Sheets-Sheet 1

JOHN A. C. YULE
INVENTOR

BY
ATTORNEY

Patented Jan. 6, 1942

2,268,791

UNITED STATES PATENT OFFICE 2,268,791

COLOR CORRECTION

John A. C. Yule, Rochester, N. Y., assignor to Eastman Kodak Company, Rochester, N. Y., a corporation of New Jersey Application April 30, 1940, Serial No. 332,564

5 Claims. (Cl. 95—2)

This invention relates to color correction in color photography and in photo-mechanical color processes.

Three-color processes of color reproduction and four-color processes which are merely three-color processes modified by the introduction of a separate control for black can be divided into additive processes and subtractive processes, as is well known. Certain errors which exist only in additive processes or are associated with the additive portion of subtractive processes have been described by many authors, for example those listed in the bibliography on page 400 of the Journal of the Optical Society of America, vol. 28, No. 11, November 1938.

It is an object of the present invention to correct these particular errors.

Certain methods of such correction are already known. It is a particular object of the invention to provide methods which are simple and more flexible and which give correction over a greater range of tones than do previous methods.

Specifically, the errors in additive processes are due to the existence of negative portions on the theoretically correct spectral sensitivity curves for making three-color separations as computed from the tri-stimulus values of a set of primaries. Since it is not practical to have a photographic emulsion, either with or without a filter, with negative response to certain colors and positive response to others, it is proposed to record the positive and negative portions separately and to subtract them. It has been theoretically shown that this step should mathematically be the linear subtraction of quantities linearly proportional to exposure if the correction is to be exactly that required in additive color processes.

According to the present invention, a color separation positive corresponding to one of the correct spectral sensitivity curves is produced by making two color separation negatives of the original, one corresponding to the positive portion and the other to the negative portion of that correct spectral sensitivity curve. Both of these negatives are made on photo-sensitive layers whose response (indicated by the characteristic curve of the emulsion used) is substantially that in which density is a direct linear function of exposure. A thin positive is then made from this second negative (the one corresponding to the negative portion of the curve) on an ordinary photo-sensitive layer, i. e. one which, except for the toe and shoulder of its characteristic curve, gives a density which is a linear function of the logarithm of exposure. This thin positive is then used to mask the first negative.

In most masking processes, a corrected negative consists of a combination of a negative and a positive in register. A corrected negative according to the present invention consists of such a combination in which the density of each point of the negative is a positive direct linear function of the reflectivity or transmission of the corresponding point of the original to light whose color corresponds to the positive portion of one of the correct spectral sensitivity curves and the density of each point of the positive being a negative direct linear function of the reflectivity or transmission of the corresponding point of the original to light whose color corresponds to the negative portion of this particular one of the correct curves. Transmission of a transparency and reflectivity of an opaque colored picture are exact equivalents, but there is no term which includes both of these words. Opacity is the inverse of either the transmission (T) or the reflectivity (R) and density is the logarithm of opacity, that is, $$\log \frac{I}{T} \text{ or } \log \frac{I}{R}$$

A direct linear function refers to a relationship of the type of $y=A_x+B$, being a positive or negative function according as the constant A is positive or negative. An inverse linear function is of the type $$\frac{1}{y} = A_x + B$$

By varying the exposure or printing times, the invention may be used for subtracting a fraction of the exposure corresponding to one spectral sensitivity curve from the total exposure corresponding to another curve. For instance, it may be used to subtract one tenth of a red filter exposure from a green filter exposure. In fact it may be used in any case where the effective subtraction of exposures is required, whether the exposures correspond to different spectral sensitivities or not.

The simplicity of masking compared with other methods of introducing color correction is, of course, one of the main advantages of the present invention. Other objects and advantages of the invention and the invention itself will be fully understood from the following description when read in connection with the accompanying drawings, in which.

Figure 5:
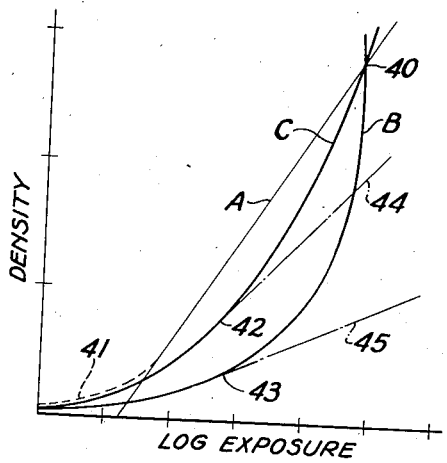
Figure 6:
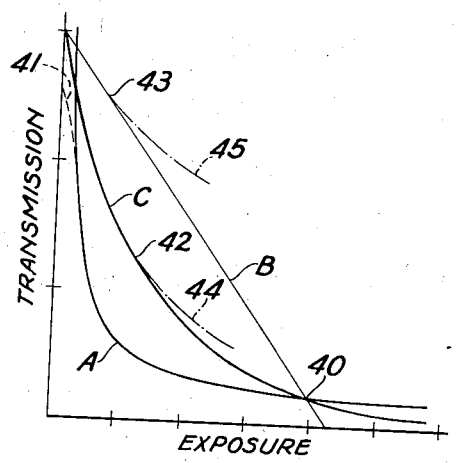
Figure 7:
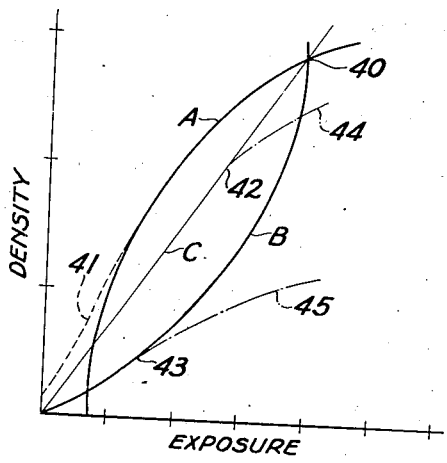

Figs. 5, 6, and 7 are graphs comparing the response of ordinary photographic emulsions, with those required by the present invention and with those required by prior methods.

Figure 8:
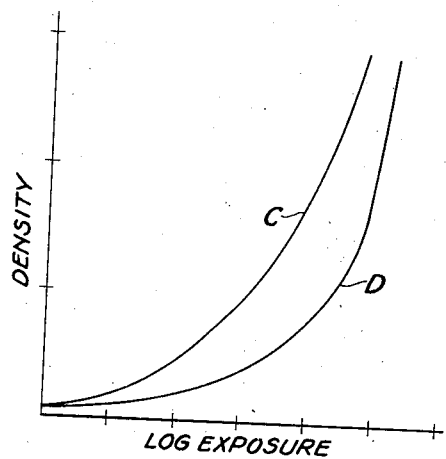

Fig. 8 illustrates by way of example the responses of negative and positive materials required by a preferred embodiment of the invention.

Figure 1:
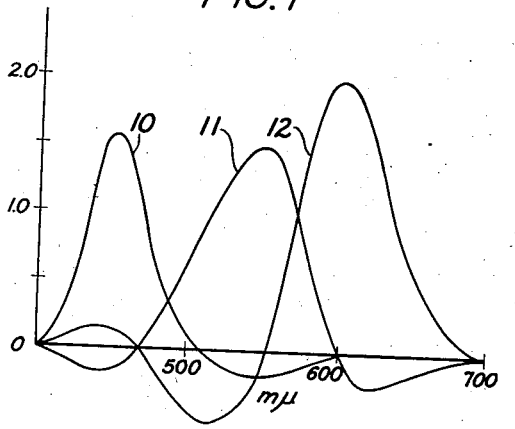
Fig. 1 shows a set of theoretically correct spectral sensitivity curves.

The curves shown in Fig. 1 are taken from "Photographic Aspects of the Theory of Three-Color Reproduction," by MacAdam, Journal of Optical Society of America, vol. 28, November, 1938, page 399. Curves 10, 11 and 12, are the spectral sensitivity curves required for a typical additive process. In general, regardless of the choice of reproduction primaries within quite generous limits, the wave lengths at which such sensitivity curves attain their maximum and half-maximum values will be within 10 millimicrons of the values indicated by the curves in this figure. In other words, the positive portions of the theoretical spectral sensitivity curves can vary only very slightly from the values shown in Fig. 1 even though quite a wide choice of reproduction primaries is available. On the other hand, the limits and magnitudes of the negative portions of the curves depend very critically on the choice of reproduction primaries. These negative portions correspond approximately in magnitude and spectral location to the areas and locations of the portions of the well known color mixture diagram lying within the spectrum locus but outside the triangle whose apices represent the reproduction primaries. If one could obtain photographic emulsions with or without filters whose responses correspond to these curves 10, 11, and 12, the fundamental errors of additive processes would be eliminated. However, it is not practical to have emulsion-filter combinations of this type and the purpose of the present invention is to simulate the same effect.

Figure 2:
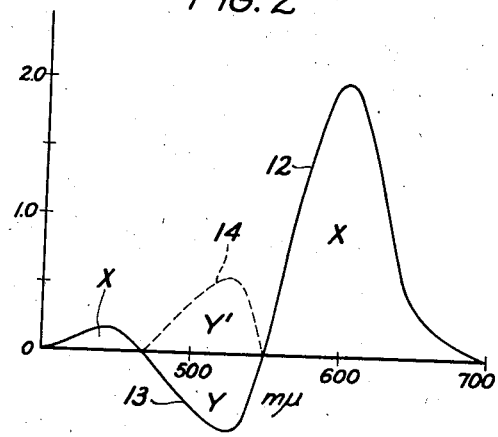
Fig. 2 shows one of these curves separate from the others.

In Fig. 2 one of the curves (12) is shown separately. The positive portion X of this curve 12 can be simulated in spectral distribution of response approximately by certain filter-emulsion combinations. This is well known. The negative portion Y as represented by the part 13 of the curve 12 may be simulated by an emulsion-filter combination whose curve 14 gives an area Y' which is the mirror image of the area Y. A proper combination of these two effects subtracting one from the other will result in the effect corresponding to the curve 12 itself.

However, the usual type of subtraction, namely masking with ordinary emulsions does not result in the subtraction of exposures as required by Fig. 2. That is, the subtraction of densities is actually the division of exposures.

Figure 3:
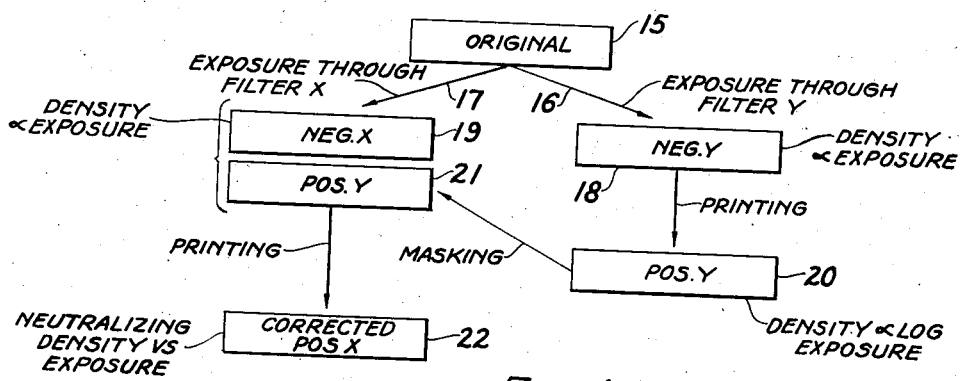
Fig. 3 is a flow chart illustrating one process according to the invention.

According to the invention as illustrated in Fig. 3, a colored original 15 is photographed as illustrated by the arrows 16 and 17 through filters corresponding to the portions X and Y of the curve 12 to form color separation negatives 18 and 19. In the example illustrated in Fig. 2, the region X corresponds substantially to orange-red with a small amount of blue and the Y is a bluish-green or at least corresponds to a low exposure to a bluish-green. However, the invention is equally applicable to any of the curves 10, 11 or 12 shown in Fig. 1, or to any of the slight variations of these curves which are theoretically possible as mentioned above. Even the positive portions of each of the curves are different from primary colors. For example, a filter with a transmission corresponding to the X portion of curve 12 would appear yellow-brown. Even if the positive portions are considered to be a kind of primary color, the negative portions are definitely not since Y' for example does not overlap at all with X as primary colors must. The portions X and Y are, in a sense, complementary. The photographic materials selected for making the color separation negatives 18 and 19 are such that their responses give a density which is a linear function of exposure rather than of the logarithm of exposure as in ordinary emulsions.

By printing on an ordinary emulsion, a positive 20 is made from the color separation negative 18. The positive 20 is thin (i. e. not dense) and corresponds to the curve 14 in Fig. 2. This thin positive 20 is then placed in the position 21 in masking register with the color separation 19. The masking combination of the negative 19 and the positive 21 forms a novel combination which constitutes a corrected color separation negative whose color corresponds to all of the curve 12. A positive 22 printed from this corrected negative constitutes a corrected color separation positive. The correction is of the type required by additive processes.

According to a preferred embodiment of the invention the photo-sensitive layer selected for making the corrected positive 22 has a response complementary to that of the negative 19 so that correct tone reproduction is obtained throughout the whole range of tone values. The best method of determining what positive material to select is to compute the required response according to the graphic method described by L. A. Jones in the Journal of the Society of Motion Picture Engineers, vol. XVI, number 5, 1931, page 568, to 599, and elsewhere.

Figure 4:
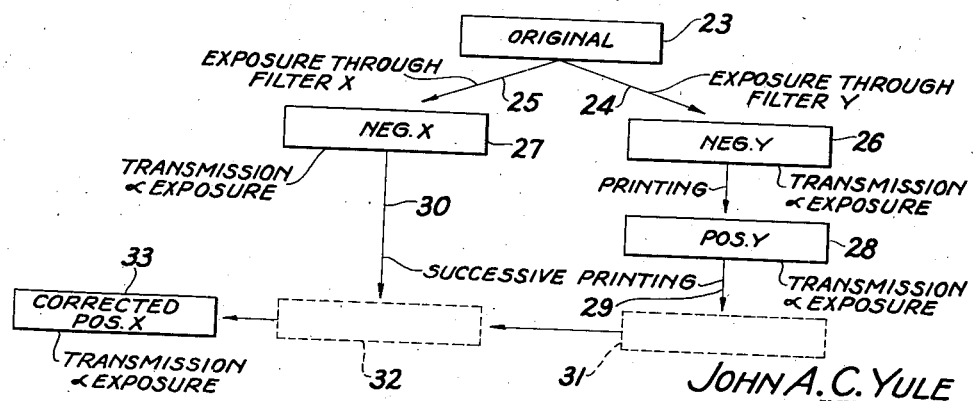
Fig. 4 is a flow chart illustrating a prior process for accomplishing the same result.

In Fig. 4 a prior process for accomplishing similar results is illustrated in which the original 23 is photographed as indicated by arrows 24 and 25 to form color separation negatives 26 and 27 on photo-sensitive layers whose transmission is proportional to exposure, that is, on layers whose transmission is a negative linear function of exposure. A positive 28 printed from the negative 26 on a similar photo-sensitive layer is used to print an additional exposure on the final corrected positive 33. The photo-sensitive material to form the final positive 33 must also have a response in which transmission is a linear function of exposure; this positive 33 is made by successive printing illustrated by the arrows 29 and 30 and by the broken line blocks 31 and 32. The simplicity of masking compared to the masking of successive exposures is obvious. There is also another fundamental advantage of the present arrangement compared to that illustrated in Fig. 4 (best described by reference to Figs. 5, 6, and 7), namely, the materials required are more easily and exactly obtainable. That is, it is easier to get an emulsion whose density is a linear function of exposure than to get one whose transmission is a linear function of exposure.

In Fig. 5 density is plotted against the logarithm of exposure in the well-known way. An ordinary emulsion has a curve of the form A with a toe 41. Throughout most of the exposure range, density is a linear function of the logarithm of exposure in an ordinary emulsion as illustrated by the fact that this curve A is a straight line. This same curve A is plotted in Fig. 6 in which transmission is plotted against exposure and is also plotted in Fig. 7 in which density is plotted against exposure. The form the curve takes in these figures is best understood by direct reference to the drawings themselves. According to the prior art illustrated in Fig. 4 a photo-sensitive layer is required in which the transmission is a negative direct linear function of exposure as illustrated by the straight line B in Fig. 6. This curve B also appears in Figs. 5 and 7. According to the present invention there is required a photo-sensitive layer whose density is a positive direct linear function of exposure as illustrated by the straight line C in Fig. 7. Each of these curves A, B, and C is merely representative of thousands of families of curves. The particular ones selected all pass through a point 40 having the same density for the same exposure, but this is merely to illustrate the differences in the types of responses.

Since photographic emulsions having the form of response illustrated by the curve B are not available, it has been proposed to work on the toe of an ordinary emulsion. A similar proposal is now made with reference to the curve C, but since the curve C comes more nearly approximating the normal curve A, it is possible to match the curve C with an ordinary emulsion over a greater range than curve B can be matched. Of course, the best approximation to either curve B or curve C will not match these curves exactly at any one point, but the simplest way to compare the ease of matching is to assume that an ordinary emulsion is selected which exactly matches the curves over the toe region. The shape of a toe of a normal curve is illustrated by the broken line 41 in each of the Figs. 5, 6, and 7. When a normal emulsion is selected which matches the curve B over the toe region, this response will leave the curve B at the point 43 and will have the form shown by the broken line 45. A similar situation holds in the case of the curve C, the actual response leaving the curve C at the point 42 and following a broken line 44.

However, the point 42 is further along the curve C than is the point 43 along the curve B and the departure represented by the portion 44 from the curve C is much less than the departure of the broken line 45 from the curve B. This is especially evident from Figures 6 and 7.

In practice, by selecting a high contrast normal emulsion which has an exceptionally long toe and which deviates very slightly from an exact match in the extreme end of the toe (but does not deviate beyond tolerance limits) an emulsion can be selected which practically matches the curve C throughout its whole range. A similar procedure in the case of curve B still leaves much to be desired because of the rapidity with which the normal response curve deviates from the curve B. In other words, it is much easier to get an emulsion in which density is a linear function of exposure than it is to get an emulsion in which the transmission is a linear function of exposure. This combined with the fact that masking is a much easier form of color correction than the making of subsequent exposures forms the main advantages of this invention.

According to the referred embodiment of the present invention, the correct response for the final corrected positive is computed graphically by Jones' method and this emulsion is used in making the corrected positive 22. The required shape is roughly that illustrated by the curve D in Fig. 8. I have found that this curve D can be matched more exactly by an ordinary emulsion than can curve B although not as easily as can curve C. In order to give linear tone reproduction, the contrast of the positive as illustrated by curve D, should be inversely proportional to the contrast of the negative at least over a substantial range of exposures. This is obvious to those who commonly employ Jones' graphic method described above.

Having thus described the preferred embodiment of my invention and illustrated a typical example thereof, I wish to point out that it is not limited to this example, but is of the scope of the appended claims.

What I claim and desire to secure by Letters Patent of the United States is:

1. In a process for the reproduction of a colored original, the method of making a color separation positive which comprises making a color separation negative of the original, the color corresponding approximately to the positive portion of one of the correct spectral sensitivity curves of a three-color additive process, making a second color separation negative of the original the color corresponding approximately to the negative portion of said one of the curves, both of said negatives being made on photo-sensitive layers whose responses are substantially those in which density is a positive direct linear function of exposure, making a positive from the second negative on a photo-sensitive layer with ordinary response, and making a positive from the first negative masked by the positive made from the second negative.

2. A method according to claim 1 in which the final positive is made on a photo-sensitive layer whose contrast is inversely proportional over a substantial range to that of the first-mentioned color separation negative whereby the product of the two contrasts gives linear tone reproduction, 3. In masking combination, a primary color separation negative of a colored original, the density at any point of the negative being a positive direct linear function of the intensity of the primary color light from the corresponding point of the original and a color separation positive in register with the negative, the density at any point of the positive being small and a negative direct linear function of the intensity of a color from the original which is substantially complementary to said primary color.

4. In masking combination and in register, a color separation negative and a color separation positive of a colored original, the density of any point of the negative being a positive direct linear function of the reflectivity or transmission of the corresponding point of the original to light whose color corresponds to the positive portion of one of the correct spectral sensitivity curves of a three-color additive process and the density of any point of the positive being a negative direct linear function of the reflectivity or transmission of the corresponding point of the original to light whose color corresponds to the negative portion of said one of the curves.

5. In a process for the reproduction of a colored original, the method of making a color separation positive, which comprises making two color separation negatives of the original corresponding to different colors on photo-sensitive layers whose responses are substantially those in which density is a positive direct linear function of exposure, making a positive from one of the negatives on a photo-sensitive layer with ordinary response and making a positive from the other negative masked by the positive made from said one of the negatives.

JOHN A. C. YULE.